United States Patent [19]

Melvin

[11] 4,087,752

[45] May 2, 1978

[54] DIGITAL COMMUNICATIONS TREE SEARCHING DETECTION

[75] Inventor: William J. Melvin, Costa Mesa, Calif.

[73] Assignee: Rockwell International Corporation, El Segundo, Calif.

[21] Appl. No.: 790,208

[22] Filed: Apr. 25, 1977

[51] Int. Cl.² .......................................... H04L 27/10
[52] U.S. Cl. ...................................... 325/30; 325/320; 325/324
[58] Field of Search .................... 325/2, 30, 39, 40, 41, 325/42, 56, 320, 321, 322, 323, 324; 178/67, 88; 340/146.1 R, 146.1 A, 146.1 BE, 147

[56] References Cited

U.S. PATENT DOCUMENTS

| | | | |
|---|---|---|---|
| 3,623,098 | 11/1971 | Jones et al. | 325/324 |
| 3,891,959 | 6/1975 | Tsuji et al. | 340/146.1 AQ |

Primary Examiner—Benedict V. Safourek
Attorney, Agent, or Firm—Howard R. Greenberg; H. Fredrick Hamann

[57] ABSTRACT

Digital data which is correlatively encoded into discrete plural states and transmitted by modulating a carrier signal whose phase in each baud interval is a function of the data is detected through a tree searching technique which recursively determines the maximum metric for each of the states during each baud interval and generates a data bit stream therefrom. The maximum metric is determined by computing the transition metric for each possible path into a state from a comparison of the baseband signal with a reference signal generated therefrom and adding it to the state metric for the prior state from which the path originated to derive a path metric and then selecting the maximum path metric for each state designated survivor decision metric. The data bit stream, there being one for each state, is generated by updating the data bit stream corresponding to its associated survivor metric by deleting the oldest bit therefrom and adding as the newest bit, the bit value associated with the survivor metric path.

26 Claims, 10 Drawing Figures

| D | $\hat{Z}_{K-1}$ | | T | | CONTROL LOGIC | | |
|---|---|---|---|---|---|---|---|
| | $\hat{I}_{K-1}$ | $\hat{Q}_{K-1}$ | $Z_K \cdot \hat{Z}_{K-1}$ | $Z_K \cdot J\hat{Z}_{K-1}$ | $D_{SEL}$ | $D_{SGN}$ | $D_{SEL} \oplus D_{SGN}$ |
| $D_1$ | 1 | 0 | $I_K$ | $Q_K$ | 1 | 0 | 0 |
| $D_2$ | 0 | 1 | $Q_K$ | $-I_K$ | 0 | 0 | 1 |
| $D_3$ | -1 | 0 | $-I_K$ | $-Q_K$ | 1 | 1 | 1 |
| $D_4$ | 0 | -1 | $-Q_K$ | $I_K$ | 0 | 1 | 0 |

| $D_{SEL}$ | INPUT |
|---|---|
| 1 | 1 |
| 0 | 2 |

| $D_{SGN}$ | INVERT |
|---|---|
| 1 | YES |
| 0 | NO |

DIGITAL COMMUNICATIONS TREE SEARCHING DETECTION

BACKGROUND OF THE INVENTION

The invention disclosed herein was made under or in the course of a contract with the Department of the U.S. Air Force. The invention pertains generally to digital communications and specifically to the detection of digital data.

The proliferation of digital communications has spurred interest in achieving higher data rates. In the absence of bandwidth restrictions, this may be easily accomplished without noticeable degradation in detection performance. However, when there is a need to conserve bandwidth so as to maximize the number of available channels such as in telephone and satellite communications, the data rate cannot be easily increased without adversely impinging on the detection performance. For example, each time the data rate is increasing by doubling the number of levels a carrier signal can assume, the signal-to-noise ratio required to support a selected error rate is normally reduced about 6 dB.

A tree searching algorithm was developed by Andrew J. Viterbi which applies a probability technique to convolutional codes to enhance the error detection and correction performance thereof. This technique is discussed in the technical literature including two papers which appeared in the October 1971 IEEE Transactions on Communication Technology entitled "Convolutional Codes and Their Performance in Communication Systems" and "Viterbi Decoding for Satellite and Space Communication" appearing at pages 751 and 835, respectively. Although this technique addresses detection performance, it does so in the context of convolutional codes which are designed to minimize errors and notoriously do not afford bandwidth conservation.

With the foregoing in mind, it is a primary object of the present invention to provide a new and improved means of digital communications through tree searching detection.

It is a further object of the present invention to provide such a new and improved means of digital communications tree searching detection which optimizes bandwidth conservation.

The foregoing objects as well as others and the means by which they are achieved may best be appreciated by referring to the Detailed Description of the Invention which follows hereinafter together with the appended drawings.

BRIEF DESCRIPTION OF THE INVENTION

In accordance with the objects of the invention, digital data is correlatively encoded into discrete plural states and then transmitted by modulating a carrier whose phase during each baud interval is a function of the data. The data is detected by demodulating the transmitted signal to obtain the baseband signal containing the data and recursively measuring the probability of the baseband signal being in each of the possible states. The probability of being in each state is determined by computing the probability of traversing each possible path into the state, designated the transition metric and adding it to the probability associated with being in the prior state, designated state metric, from which the path originated to arrive at a path metric. The transition metric is determined by taking the dot products of the baseband signal and a reference signal generated therefrom through a differential scheme in which the reference signal in each baud interval corresponds to the estimated or actual baseband signal of the immediately preceding baud interval or an absolute scheme where the reference signal tracks the baseband signal. Each state metric is chosen to be the maximum of its path metrics, designated survivor metric, and is used as the prior state metric for the next baud interval. A data bit stream is generated for each state which consists of the data bit stream generated for the prior state in the previous baud interval corresponding to its survivor metric less the oldest bit thereof and a newest bit whose value is that of the digital bit associated with the survivor metric path as determined from the encoding and modulation employed. It has been shown (see "Convolutional Codes . . . " IEEE Article previously alluded to) that when the number of bits in the data bit stream is about six times the constraint length of the encoder register, the oldest bit for all of the state data bit streams will be the same and indeed equal to the transmitted data bit.

Bandwidth conservation is assured by correlatively encoding the data into three levels which are then employed to frequency modulate a carrier signal having a center frequency $f_c$ and upper and lower frequencies equal to $f_c \pm \Delta f$ where $\Delta f$ is equal to one-quarter of the data rate so that during each baud interval the carrier signal shifts 0°, +90°, or −90°. The correlative encoding, which makes the encoder output dependent on the previous data bit, introduces a memory factor into the digital communications which then renders the Viterbi algorithm eminently suited to the tree searching detection herein.

DETAILED DESCRIPTION OF THE INVENTION

Figure 1:
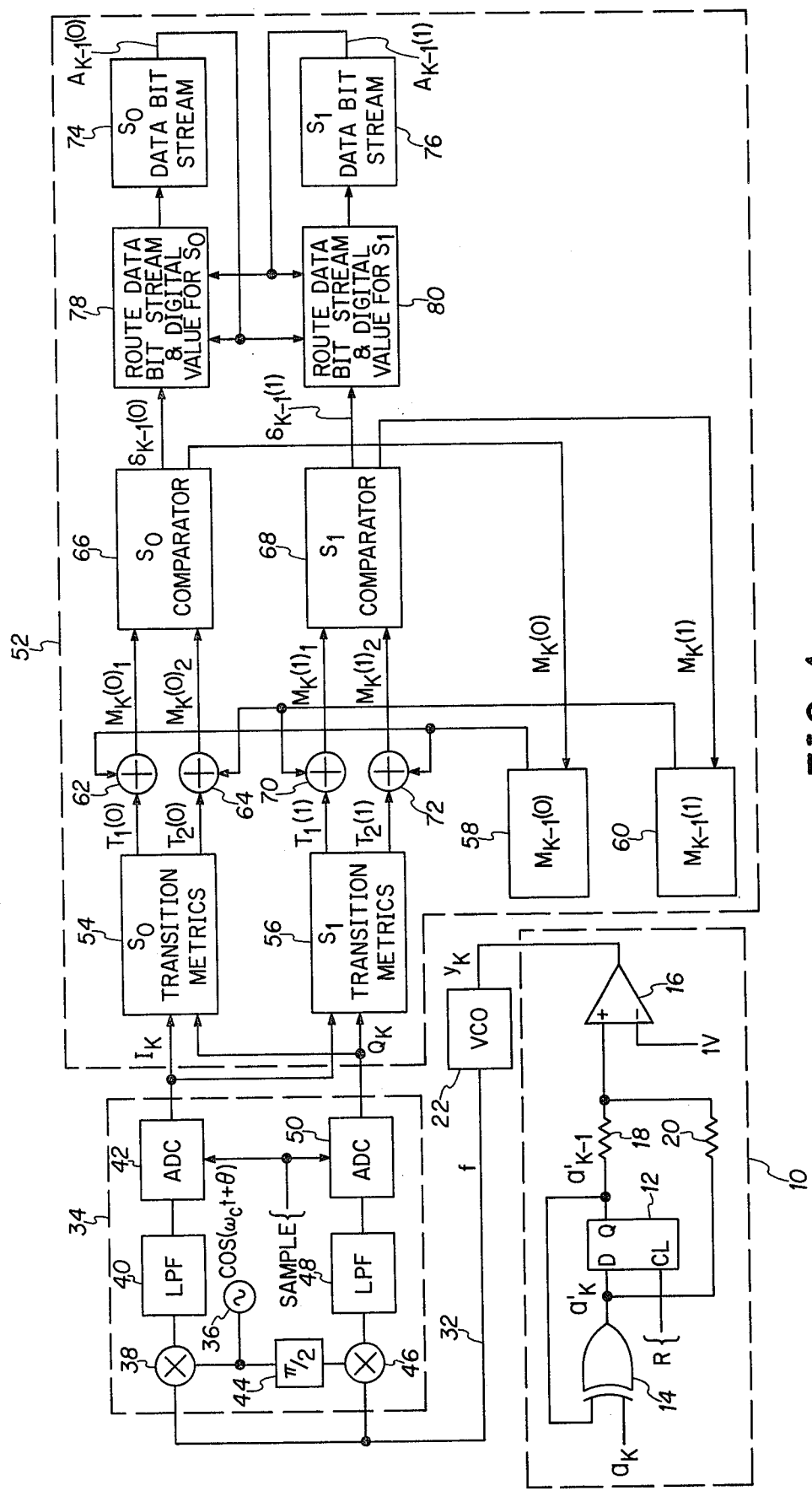
FIG. 1 is a block diagram depicting a typical digital communications system employing the tree searching detection of the invention.

Although, as will be appreciated hereinafter, the invention has broad applications, it will be described in connection with a specific encoding and modulation scheme to facilitate its exposition herein. Accordingly, FIG. 1 depicts a digital encoder 10 for encoding the input digital data $a_k$ which may assume a binary logic level one ("1") or zero ("0"). Digital encoder 10 comprises a shift register such as D-type flip-flop 12 which is clocked at the data rate R and which receives the digital input data $a_k$ on its D-input lead via the output $a'_k$ of an exclusive OR gate 14. Correlative encoding is afforded by applying the Q output $a'_{k-1}$ of flip-flop 12 as the second input to exclusive OR gate 14 thereby rendering the encoder 10 output a function of the previous received input data. It is this memory feature which renders the tree searching algorithm developed by Viterbi previously alluded to under Background of the Invention eminently suitable for detection purposes. The signals $a'_k$ and $a'_{k-1}$, which will be assumed equal to 1 volt for a "1" and zero volts for a "0" only for expediency, are summed in an operational amplifier 16 by application to its positive (+) input via respective resistors 18 and 20. The output of operational amplifier 16, $y_k$, which is equal to the difference between the sum of $a'_k$ and $a'_{k-1}$ and one volt which is applied to the negative (−) input of amplifier 16 is applied to a voltage controlled oscillator (VCO) 22 to control its output frequency ($f$). The frequency $f$ may assume any one of three different values dependent on the value of $y_k$ which may be 0 or ± 1. A voltage of 0 causes the VCO 22 to produce an output frequency $f_c$ while a voltage of 1 volt shifts its frequency in the same direction as the voltage polarity by $\Delta f$, preferably equal to one-quarter of the data rate R. Thus −1 volt reduces $f_c$ by R/4 and +1 volt increases it by R/4, causing a continuous and uniform 90° phase shift in the baseband signal or complex envelope over the transmission time for each data bit or baud interval [$\Delta\theta$/baud = $2\pi \Delta fT$ ($T$=baud interval) = $2\pi (\frac{1}{4}T)T = \pi/2$ where $\Delta f = R/4$ & $R = 1/T$]. This is a modified arrangement of a modulation scheme known as minimum shift keying (MSK) which is described in detail in U.S. Pat. No. 2,977,417 entitled "Minimum Shift Data Communication System." That system employs two levels of frequency which requires a baseband signal 90° phase shift in each baud interval and permits transitions between plus and minus phase shifts in consecutive baud intervals, while the subject modulation entails three levels of frequency with the center frequency $f_c$ affording a baseband signal phase shift of 0° and the encoding precludes a transition between plus and minus phase shifts without first passing through one baud interval of 0° phase shift, thus avoiding discontinuities at baud interval transitions which results in the desired bandwidth conservation.

Figure 2:
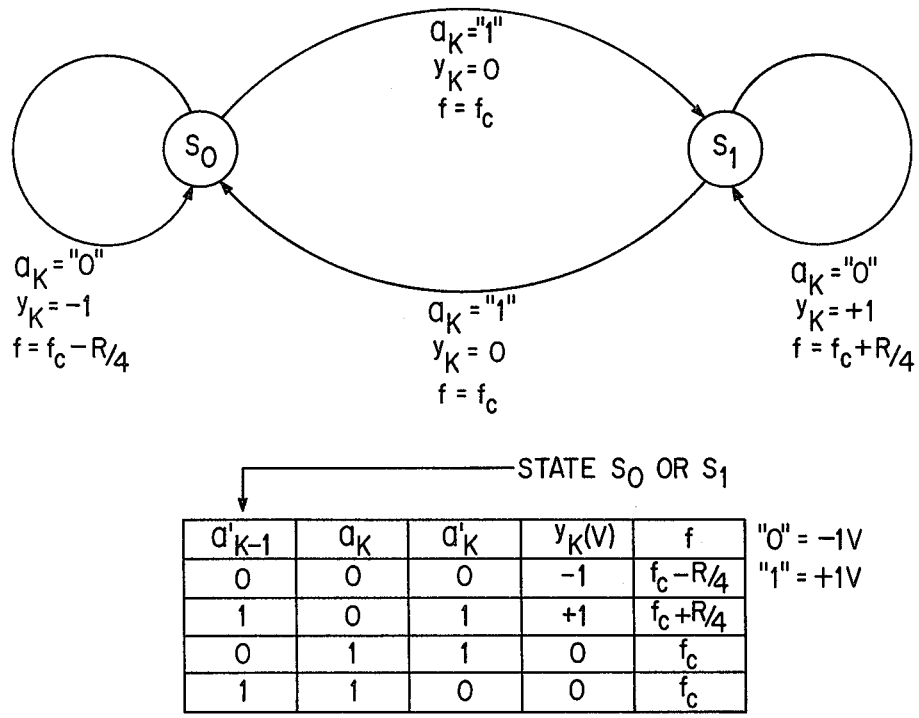
FIG. 2 is a state diagram and associated chart for the correlative encoder employed in the transmitter of the system of FIG. 1.

In the encoder state diagram of FIG. 2, the circles labeled $S_o$ and $S_1$ represent respectively the "0" and "1" states for $a'_{k-1}$. During any given baud interval the encoder state $a'_{k-1}$ is determined by the encoder state and digital bit value $a_k$ of the immediately preceding baud interval (correlation factor). Using the table accompanying the state diagram, it will be readily seen that if the encoder were in state $S_o$ in baud interval $k-1$ and the digital bit value for the input data $a_k$ was "0", the encoder would remain in that state during the next baud interval $k$ represented by the arrow returning upon itself for $S_o$, producing a $y_k$ of −1 and an $f$ of $f_c$ − R/4 at the output of VCO 22. It will be further seen that if the encoder state were $S_1$ while a "0" were received for $a_k$, the encoder would likewise remain in the same state, the arrow returning upon itself to the $S_1$ circle. However, once again referring to the table, $y_k$ would assume a +1 value and the frequency of the VCO 22 would be $f_c$ + R/4. Irrespective of the encoder state, a digital bit value for the input data $a_k$ of "1" produces a change of encoder state during the ensuing baud interval. In this case, $y_k$ assumes a value of zero and the VCO 22 output frequency $f$ a value of $f_c$. Notice that it is not possible to change between $f_c$ − R/4 and $f_c$ + R/4 without first passing through $f_c$ for at least one baud interval.

Figure 3:
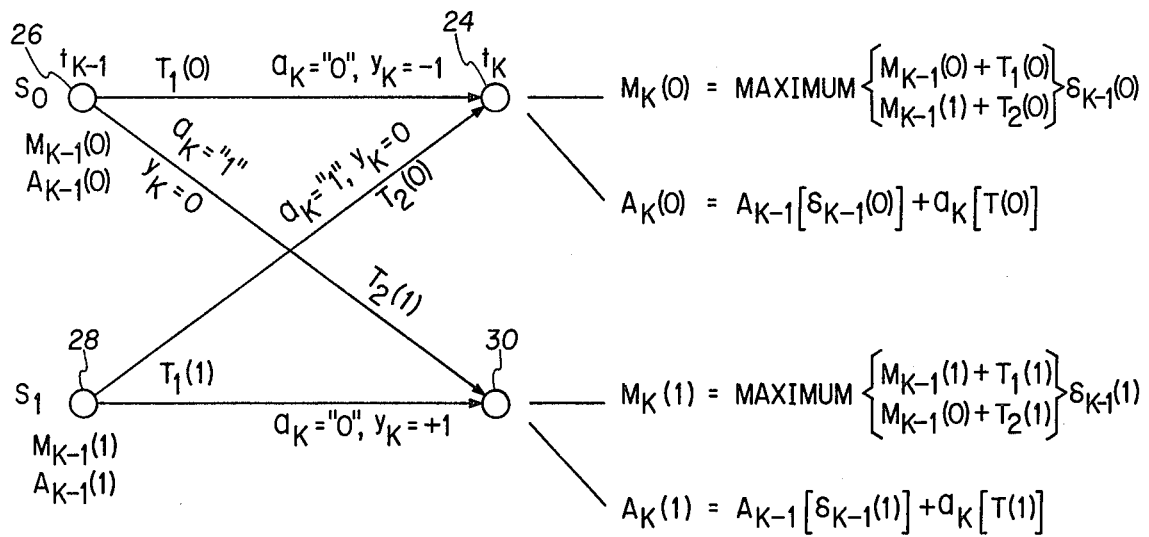
FIG. 3 is a tree diagram derived from the state diagram of FIG. 2 expository of the tree searching technique.

As previously mentioned, the tree searching algorithm propounded by Viterbi examines the probability of being in a particular state by looking at the various individual paths which lead into that state. FIG. 3 is a tree diagram for the receiver baseband signal after extracting the carrier through demodulation corresponding to the transmitted baseband signal associated with FIG. 2, and in fact would be the same in the absence of corruption caused by noise. Referring now to FIG. 3, if at time $t_k$ for baud interval K, the baseband signal was in state $S_o$ represented by circle 24 it could have arrived there over the top horizontal path from state $S_o$, represented by circle 26, in the previous baud interval corresponding to time $t_{k-1}$ if $a_k$ were equal to "0" or over the diagonal path from state $S_1$ in the previous baud interval, represented by circle 28, if $a_k$ were equal to "1". Similarly, if the baseband signal in the K baud interval were in the state $S_1$, represented by circle 30, then it could have arrived there via the lower horizontal path from prior state $S_1$ (circle 28) if $a_k$ were equal to a "0" or over the diagonal path from prior state $S_o$ (circle 26) if $a_k$ were "1". In accordance with the Viterbi algorithm, one selects the most likely path into each state $S_o$ (circle 24) and $S_1$ (circle 30) by examining all the possible paths (tree branches) thereinto and selecting the one thereamong having the maximum probability. For example, looking at $S_o$ (circle 24), the probability of being in that state is equal to the probability of being in the prior state $S_o$ designated as prior state metric or $M_{k-1}(0)$ plus the probability of traversing the top horizontal path which originated from that prior state, designated transition metric or $T_1(0)$. This sum may be referred to as the path metric. The probability of entering state $S_o$ (circle 24) from state $S_1$ (circle 28) over the diagonal path is equal to the prior state metric $M_{k-1}(1)$ associated with the latter plus the transition metric $T_2(0)$. Whichever one of these two path metrics affords the larger probability generates a survivor decision metric $\delta_{k-1}(0)$ for state $S_o$ which identifies the most likely path for entering the state as well as the originating prior state from which it emanated. The corresponding path metric then becomes the updated state metric for $S_o$ for use as its prior state metric in the K + 1 baud interval. A like calculation is made for state $S_1$ as depicted in FIG. 3. Prior to receiving a transmitted signal, the state metrics for $S_o$ and $S_1$ would normally be set to zero and then updated during each baud interval by accumulating the successive transition metrics T corresponding to the survivor decision metrics $\delta_{k-1}$ whose determination will be explained shortly.

A data bit stream of fixed length $A_k$ is generated for each state $S_o$ and $S_1$ which consists of the data bit stream generated for the prior state identified by its survivor decision metric $\delta_{k-1}$ less the oldest bit thereof and whose newest bit is equal in value to the data bit corresponding to the path associated with $\delta_{k-1}$. For example, if state $S_o$ at time $t_k$ was entered over the top horizontal path from state $S_o$, then the data bit value for $a_k$ would have had to been a "0" whereas if entry were from state $S_1$ over the diagonal path, $a_k$ would have been equal to a "1". If the former was called out by the survivor decision metric $\delta_{k-1}$, the data bit stream for $S_o$ at $t_k$ would be equal to $A_{k-1}(0)$ less its oldest bit and having a "0" for its newest bit. If the diagonal path from state $S_1$ corresponded to the survivor decision metric $\delta_{k-1}(0)$ then the data bit stream for $S_o$ at $t_k$ would be equal to $A_{k-1}(1)$ less its oldest bit with a "1" being inserted as its newest bit. The same calculation would be made for generating a data bit stream for state $S_1$. As shown by Viterbi, when the generated data bit stream has a number of bits equal to about six times that of the stages in the encoding register, the oldest bit for the various state data bit streams converges to the same value and indeed is equal to the actual transmitted data bit. In the instant case, the data bit stream would have a minimum length of six bits corresponding to the single stage shift register 12.

Before describing how the transition metric T is calculated herein, reference back to FIG. 1 will demonstrate how the tree searching detection is applied to the digital communication systems under consideration. After the digital data $a_k$ is encoded and used to modulate the output of the VCO 22 by controlling the baseband phase shift in each baud interval, it is transmitted to a distant point over a channel symbolically represented by line 32. Upon reception, the transmitted signal is demodulated through a demodulating circuit 34 to provide the baseband signal engendering the digital data $a_k$ preferably in the form of the complex in-phase and quadrature components $I_k$ and $Q_k$ of the phasor $Z_k$ representing the signal in the complex plane. This is done by mixing the transmitted signal with an injection signal $\text{Cos}(\omega_c t + \theta)$ derived from the output of a sinusoidal generator 36 where $\omega_c = 2\pi f_c$ and $\theta$ can be any arbitrary phase angle. It will be appreciated by those skilled in the art that the direct mixing of the transmitted signal with the output of generator 36 in multiplier 38 produces the in-phase component $I_k$ after passage through lowpass filter 40 in analog form. By passing the signal through an analog/digital converter (ADC) 42 whose output is sampled at the end of each baud interval, the sample signal being derived from a suitable clock (not shown), $I_k$ is transformed to a digital value. The component $Q_k$ is obtained by mixing the output of generator 36 after passage through a 90° phase shifter 44 with the transmitted signal in multiplier 46 and likewise passing its output through lowpass filter 48 and analog-to-digital converter 50. Ideally $I_k$ and $Q_k$, constituting a baseband signal (complex envelope) which engenders the input digital data $a_k$, will be equal to zero or plus or minus some fixed value in the absence of channel noise. Noise in the channel 32 of course corrupts the transmitted signal so that the baud interval phase shift will not always be 0° or ±90°; the magnitude and signs of $I_k$ and $Q_k$, however, may be used as a measure of the probability that the signal associated with the closest ideal noise free value thereto (ascertainable from the encoding and modulation scheme) was transmitted as effectuated through the Viterbi algorithm.

The tree searching detection is performed by a tree searching detector 52 which comprises two transition metric blocks, 54 and 56, for receiving the baseband signal (preferably in the form of $I_k$ and $Q_k$ components) and developing the transition metrics T respectively for states $S_o$ and $S_1$. The transition metrics $T_1(0)$ and $T_2(0)$ for state $S_o$ are appropriately added to the prior state metrics $M_{k-1}(0)$ and $M_{k-1}(1)$ which are respectively stored in blocks 58 and 60 via adders 62 and 64, respectively. The outputs of adders 62 and 64, representing the path metrics for the two paths into the state $S_o$, are compared in comparator 66 which determines the maximum one thereof and provides an indication in the form of the survivor decision metric $\delta_{k-1}(0)$. The maximum path metric is fed back to block 58 where it is stored to serve as the prior state metric in the next baud interval. A comparator 68 affords the same functions as the foregoing in connection with the outputs of two more adders, 70 and 72, whose outputs represent the path metrics over the two paths into state $S_1$.

Associated with state $S_o$ and $S_1$ are two data bit stream blocks, 74 and 76, respectively, which store their respective prior state data bit streams $A_{k-1}(0)$ and $A_{k-1}(1)$, respectively. The states $S_o$ and $S_1$ also have associated therewith routing blocks 78 and 80, respectively, each of which receives the data bit stream outputs from both blocks 74 and 76 and routes the appropriate one to its associated data bit stream block in response to the survivor decision metric $\delta_{k-1}$ applied thereto. For example, if $\delta_{k-1}(0)$ corresponds to prior state $S_o$, then block 78 routes the output $A_{k-1}(0)$ of block 74 back thereinto less its oldest bit. If $\delta_{k-1}(0)$ corresponds to prior state $S_1$, then the output $A_{k-1}(1)$ of block 76 would be routed through block 78 into block 74. In addition to routing the appropriate data bit stream, $A_{k-1}$, blocks 78 and 80 also provide the appropriate digital value for insertion into the newest bit position of the data bit stream in accordance with the particular path corresponding to the survivor decision metric $\delta_{k-1}$.

Figure 4:
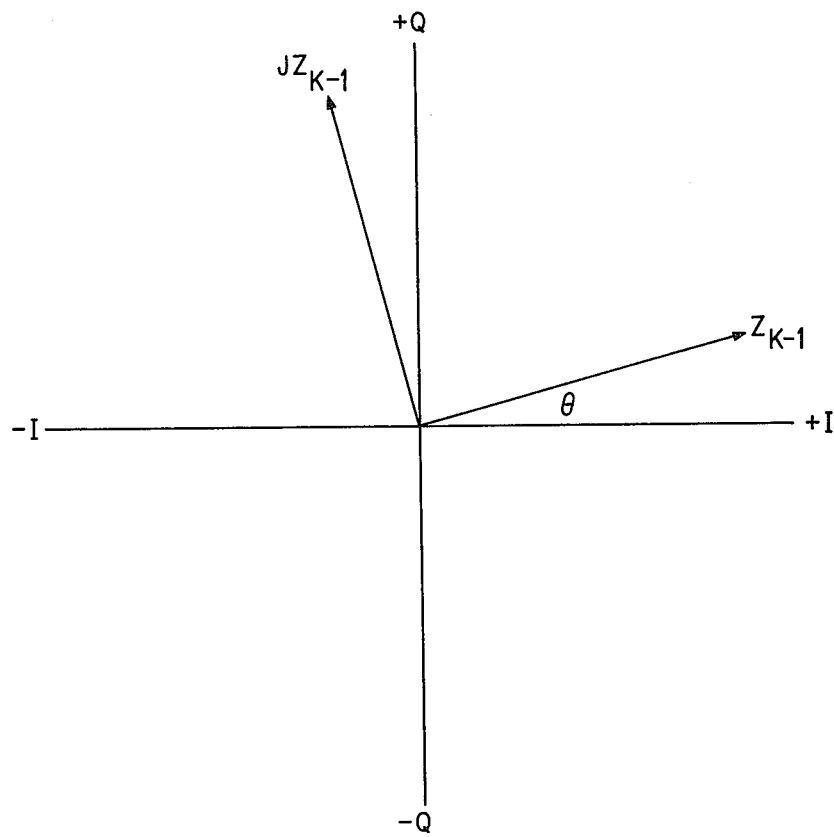
FIG. 4 is a phasor diagram together with associated charts showing how the dot products of the baseband and reference signals are generated to compute the transition metric of the various paths into each state.

The transition metric T is obtained by comparing the baseband signal $Z_k$ preferably through its $I_k$ and $Q_k$ components, with a reference signal which is derived therefrom and whose relative closeness to the reference signal is a measure that the signal represented by the reference was in fact transmitted. This measure of closeness is gauged by making a dot product analysis of the baseband and reference signals (the product of their magnitude multiplied by the Cosine of the angle therebetween). Three different ways will be presented by generating a reference signal against which to compare the baseband signal. The first is designated a differential method wherein the baseband signal in each baud period is stored and used as a reference signal in the immediately succeeding baud interval. As shown in FIG. 4, the reference signal designated $Z_{k-1}$ forms an angle $\theta$ with respect to the horizontal I (the I and Q axes being the complex components for the output of generator 6) which is a result of the arbitrary phase angle for the output of generator 36 which would be common to all samples and thus of no effect in the detection process. Referring to the table immediately below the phasor diagram, it will be appreciated that if there is no differential phase shift between consecutive baud intervals, the baseband signal $Z_k$ will coincide with the reference signal $Z_{k-1}$ affording a normalized dot product $(Z_k \cdot Z_{k-1})$ of 1 corresponding to the carrier frequency $f_c$. However, if the transmitted frequency is other than the carrier signal frequency $f_c$, then a 90° phase shift will have occurred and the dot product of $Z_k$ and $Z_{k-1}$ will be equal to 0 since the COS of $\pi/2$ is 0. To ascertain whether the 90° phase shift is + or −, $Z_k$ is compared with $Z_{k-1}$ shifted +90° which is equivalent to multiplying $Z_{k-1}$ by the operator $j$. If the 90° phase shift was positive, then the dot product of $Z_k$ and $jZ_{k-1}$ will be 1 since they would coincide, while a negative 90° phase shift affords a dot product of −1 since they would be separated by 180°. If there were in fact no phase shift, then the dot product of $Z_k$ and $jZ_{k-1}$ would be 0. These two dot product computations are thus sufficient to characterize $Z_k$ vis-a-vis the reference signal $Z_{k-1}$.

Referring back to FIG. 3, the transition metric $T_1(0)$ for state $S_o$ is maximum when the dot product of $Z_k$ and $jZ_{k-1}$ is −1 ($y_k = -1$). Similarly, the transition metric $T_2(0)$ is maximum when the dot product of $Z_k$ and $Z_{k-1}$ is 1 ($y_k = 0$). The transition metrics $T_1(1)$ and $T_2(1)$ for state $S_1$ are maximum when the dot products of $Z_k$ and $Z_{k-1}$ and $Z_k$ and $jZ_{k-1}$ are respectively maximum both equal to 1. The foregoing is tabulated in the bottom Table of FIG. 4.

Figure 5:
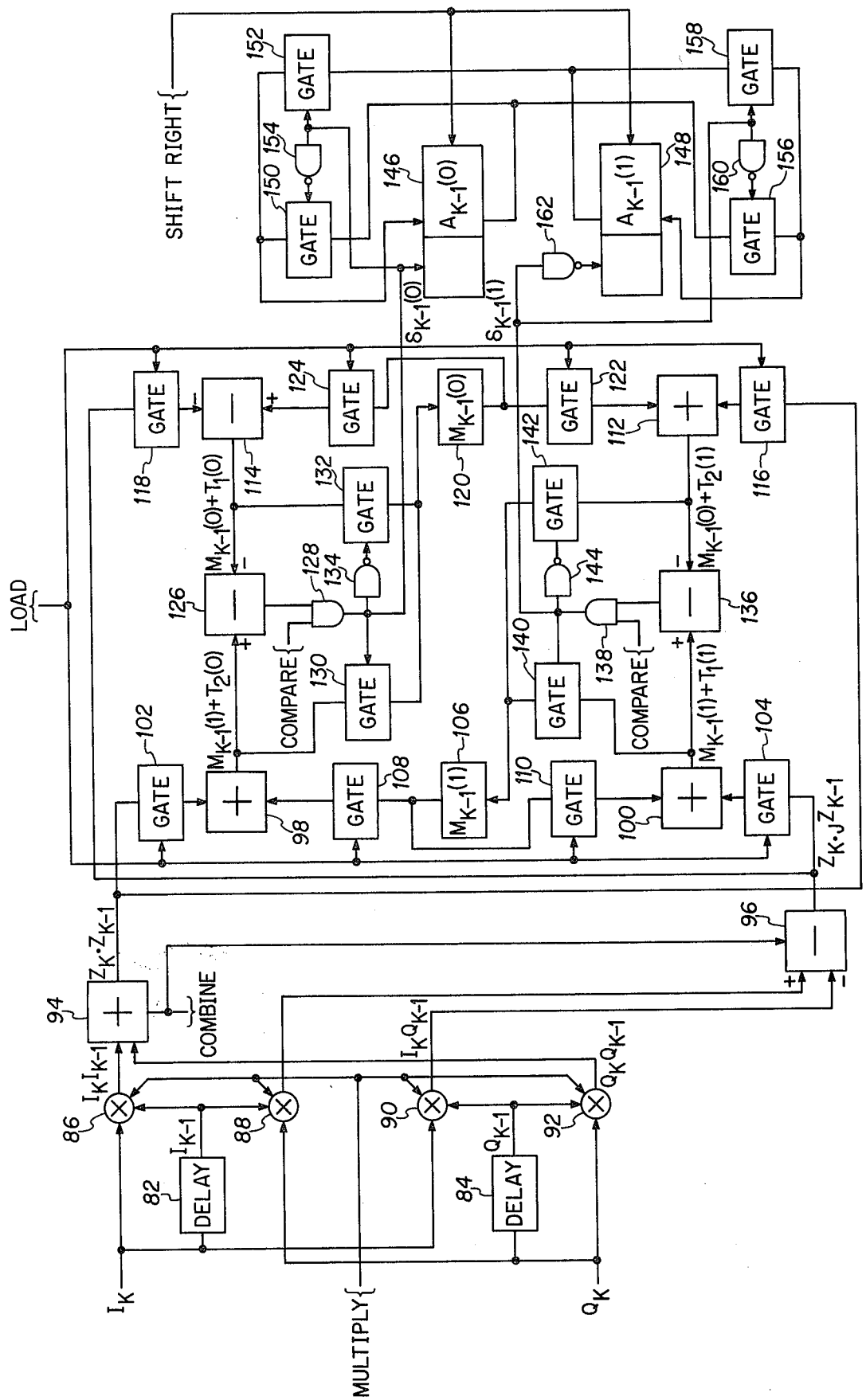
FIG. 5 is a detailed drawing of a differential implementation for computing the dot product wherein the baseband signal during each baud interval is used as the reference signal in the next succeeding baud interval.

The logic circuitry for implementing the differential reference signal method of FIG. 4 is shown in FIG. 5. It may be recalled from vector methematics that:

$$Z_k \cdot Z_{k-1} = I_k \times I_{k-1} + Q_k \times Q_{k-1}, \text{ and}$$

$$Z_k \cdot jZ_{k-1} = Q_k \times I_{k-1} - I_k \times Q_{k-1}$$

The foregoing scalar products are obtained after first obtaining $I_{k-1}$ and $Q_{k-1}$ by passing $I_k$ and $Q_k$ through delay circuits 82 and 84, respectively, whose outputs are delayed from their inputs by one baud interval. Under the control of a multiply signal which is derived from a suitable synchronized timing source (not shown), multipliers 86, 88, 90 and 92 provide at their outputs, respectively, $I_kI_{k-1}$, $Q_kI_{k-1}$, $I_kQ_{k-1}$, and $Q_kQ_{k-1}$ in response to the appropriate signals applied to their inputs. Under the control of a combine signal also derived from the synchronized timing source, adder 94 sums the outputs of multipliers 86 and 92 to provide at its output the dot product of $Z_k$ and $Z_{k-1}$ while a subtractor 96 subtracts the output of multiplier 90 from the output of multiplier 88 to provide the dot product of $Z_k$ and $jZ_{k-1}$ at its output.

In response to a load signal from the synchronized timing source, the outputs of adder 94 and subtractor 96 are parallel loaded into adders 98 and 100, respectively, via respective gates 102 and 104. Simultaneously therewith, the output of a register 106 which stores the digital value for the prior state metric $M_{k-1}(1)$ is applied as a second input to adders 98 and 100 via respective gates 108 and 110. The output of adder 98 is thus seen to be the path metric $m_{k-1}(1) + T_2(0)$ representing the probability of entering state $S_o$ (circle 24) over the diagonal path from the prior state $S_1$ (circle 28) of FIG. 3, while the output of adder 100 is the path metric $M_{k-1}(1) + T_1(1)$ for entering the state $S_1$ (circle 30) from the prior state $S_1$ (circle 28).

In response to the aforementioned load signal, the outputs of adder 94 and subtractor 96 are also respectively entered into an adder 112 and subtractor 114 via respective gates 116 and 118. At this time the output of a register 120 which is the digital equivalent for the prior state metric $M_{k-1}(0)$ is parallel loaded as a second input to adder 112 and subtractor 114 via respective gates 122 and 124. The output of adder 112 is the path metric $M_{k-1}(0) + T_2(1)$ for entering state $S_1$ (circle 30) from prior state $S_o$ (circle 24) while the output of subtractor 114 is the path metric $M_{k-1}(0) + T_1(0)$ for entering the state $S_o$ (circle 24) from prior state $S_o$ (circle 26).

The path metrics for state $S_o$ are compared in a subtractor 126 whose output is high when the survivor decision metric $\delta_{k-1}(0)$ corresponds to prior state $S_1$ and low when its corresponds to prior state $S_o$. In response to a compare signal derived from the synchronized timing source, the output of subtractor 126 is passed through an AND gate 128 to enable a gate 130 when high or a gate 132 via inverter 134 when low. The input of register 120 is interconnected with the outputs of adder 98 and subtractor 114 by gates 130 and 132, respectively, which permits it to store the updated state metric $M_{k-1}(0)$ when the survivor decision metric corresponds to prior state $S_1$ (gate 130 enabled) or $S_o$ (gate 132 enabled).

In a similar vein, the outputs of adders 100 and 112 are applied to a subtractor 136 whose output is high when the survivor decision metric for state $S_1$ corresponds to prior state $S_1$ and low when it corresponds to state $S_o$. The output of subtractor 136 is applied through an AND 138 in response to the aforementioned compare signal to directly enable a gate 140 when high and a gate 142 via inverter 144 when low. The outputs of both gates are connected to the input of register 106 while the input of gate 140 is connected to the output of adder 100 and the input of gate 142 is connected to the output of adder 112. Consequently, the metric $M_{k-1}(1)$ stored in register 106 is updated from the output of adder 100 when the survivor decision metric $\delta_{k-1}(1)$ for state $S_1$ corresponds to prior state $S_1$ and from the output of adder 112 when it corresponds to state $S_o$.

The data bit streams for states $S_o$ and $S_1$ are generated, respectively, in registers 146 and 148 which in accordance with the Viterbi algorithm should have a number of stages equal to about six times the constraint length of the encoder register (6 bits vis-a-vis the 1 bit shift register 12 of the subject encoder). After the commencement of each baud period, the data bit streams in the registers 146 and 148 are shifted once to the right in response to a shift right signal thus ejecting from the register the oldest bit thereof which is considered to be a valid data bit and presumably would be appropriately processed. At the end of the baud interval, the data bit stream $A_{k-1}$ less the oldest bit which was ejected is loaded back into the same register if the associated state and prior state corresponding to its survivor decision metric are the same or the other register if they are not. For example, the input of register 146 for all the bits but the most recent one (leftmost) is connected to the counterpart output of register 146 via gate 150 and the counterpart output of register 148 via gate 152. Gate 152 is enabled by a high-level signal at the output of AND gate 128 to pass the data bit stream $A_{k-1}(1)$ less its oldest bit into register 146 to update $A_{k-1}(0)$ when the survivor decision metric $\delta_{k-1}(0)$ for state $S_o$ corresponds to prior state $S_1$. If the output of AND gate 128 is low indicating that the prior state was not $S_1$ but $S_o$, then gate 150 is enabled to return the data bit stream $A_{k-1}(0)$ less its oldest bit to register 146 by virtue of inverter 154. Gates 156 and 158 interconnecting the input of register 148 with the outputs of register 146 and 148, respectively, together with inverter 160 will be seen to afford a like operation with respect to register 148.

After shifting the data bit streams in registers 146 and 148 to the right, the newest or leftmost bit thereof is generated by applying thereto the digital value for the data bit corresponding to the survivor decision metric path. In the case of register 146 and state $S_o$, the digital value is taken from the output of AND gate 128 directly which will be high corresponding to a "1" for $a_k$ when the survivor decision metric $\delta_{k-1}(0)$ corresponds to the prior state $S_1$ and low when it does not. In the case of register 148 and state $S_1$, the output of AND gate 138 is first inverted via inverter 162 before being applied to the leftmost stage thereof since the output of AND gate 138 is always opposite to the data bit value corresponding to the survivor decision metric $\delta_{k-1}(1)$ for $S_1$.

Figure 6:
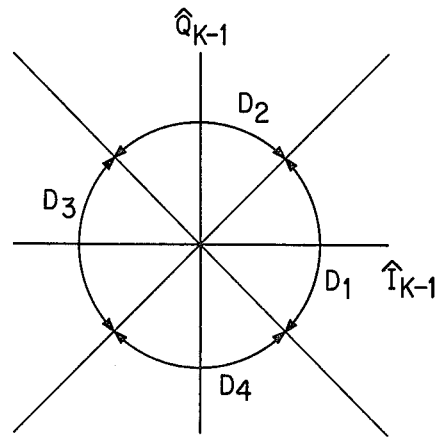
FIG. 6 depicts a second differential implementation for generating the dot product entailing decision regions and an estimate of the reference signal to simplify the dot product circuitry.

A second way for providing the reference signal $Z_{k-1}$ is depicted in FIG. 6 wherein the complex plane is organized into four 90° decision regions $D_1$–$D_4$ and the reference signal $Z_{k-1}$, obtained through a phase lock loop circuit which controls the phase of the injection signal generator 36 (to be explained shortly) is estimated to lie within one of the regions along the horizontal I or vertical Q axes (generator 36 output) so that the value of its $\hat{I}_{k-1}$ and $\hat{Q}_{k-1}$ components as shown by the table of FIG. 6 is always plus or minus 1 or 0. This being so, the dot products for measuring the transition metrics assume the values shown in the table by substituting the $\hat{I}_{k-1}$ and $\hat{Q}_{k-1}$ values into the equations previously used. This affords a simply way to compute the dot products without the need for the commercially costly digital multipliers 86–92 of the differential approach shown in FIG. 5. The dot product results can be defined with two control logic signals, namely, $D_{SEL}$ to specify when $|Z \cdot Z_{k-1}|$ and $|jZ \cdot Z_{k-1}|$ are respectively $I_k$ and $Q_k$ ($D_{SEL}$="1") or $Q_k$ and $I_k$ ($D_{SEL}$="0"), $D_{SGN}$ to specify when $Z_k \cdot Z_{k-1}$ is positive ($D_{SGN}$="0") or negative ($D_{SGN}$="1") and a third signal $D_{SEL} \pm D_{SGN}$ derived from the two foregoing ones to specify when $Z_k \cdot jZ_{k-1}$ is positive ($D_{SEL} \oplus D_{SGN}$ = "0") or negative ($D_{SEL} \oplus D_{SGN}$ = "0") or negative ($D_{SEL} \oplus D_{SGN}$ = "1").

Figure 7:
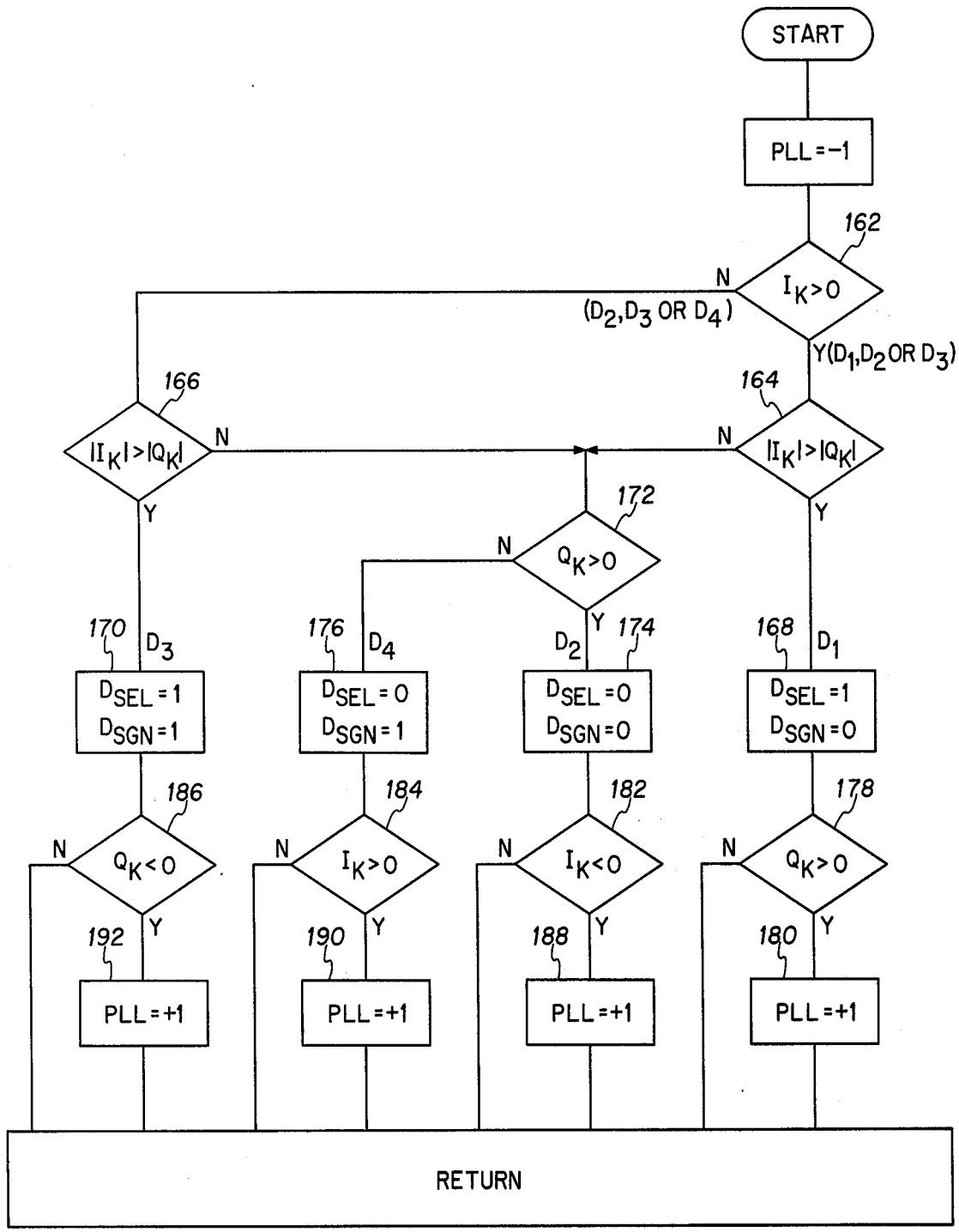
FIG. 7 is a flow diagram for the algorithm to implement the decision region approach of FIG. 6.

The control logic signals $D_{SEL}$ and $D_{SGN}$ may easily be generated through implementation of the algorithm depicted in the flow chart of FIG. 7 wherein a phase lock loop (PLL) control signal of +1 tends to shift the phase of the injection signal of the output of generator 36 clockwise and a −1 tends to shift it counterclockwise. At the beginning of each computation, it is assumed that a −1 is required for shifting the signal phase counterclockwise. If the $I_k$ component of the baseband signal $Z_k$ in the complex plane is greater than 0 represented by branch point 162, then $Z_k$ must lie in regions $D_1$, $D_2$, or $D_4$ so that the algorithm then moves to branch 164. If $I_k$ does not exceed 0, then $Z_k$ must lie in regions $D_2$–$D_4$ which moves the algorithm to branch 166. At branch 164, if the absolute value of $I_k$ exceeds the absolute value of $Q_k$, then $Z_k$ perforce must lie in region $D_1$ which moves the algorithm to block 168 to generate the control signals $D_{SEL}$ equal to "1" and $D_{SGN}$ equal to "0". If the absolute value of $I_k$ exceeds that for $Q_k$ at branch 166, then $Z_k$ perforce must lie in decision region $D_3$ whereby the algorithm moves the block 170 to generate control signals $D_{SEL}$ and $D_{SGN}$ both having a value "1". If the absolute value of $I_k$ is less than the value of $Q_k$ at either branch 164 or 166, the algorithm then moves to branch 172 where a determination is made as to whether or not $Q_k$ exceeds 0. If it does, then $Z_k$ must lie in region $D_2$ whereby the algorithm moves to block 174 to generate control signals $D_{SEL}$ and $D_{SGN}$ both having a value of "0". If $Q_k$ is less than 0, $Q_k$ must lie in decision region $D_4$ whereby the algorithm moves to block 176 to generate control signals $D_{SEL}$ and $D_{SGN}$ having values of "0" and "1", respectively.

If $Z_k$ has been determined to lie in decision region $D_1$ and $Q_k$ exceeds 0, represented by branch 178, the phase of $Z_k$ is ahead of $\hat{Z}_{k-1}$, requiring that the phase lock loop circuit retard the injection tracking signal at the output of generator 36 which gave rise to the components $I_k$ and $Q_k$ in the first place, so as to bring it into coincidence with $\hat{Z}_{k-1}$. This is accomplished by generating a +1 (to produce a clockwise shift in phase for $Z_k$) for application by the phase lock loop circuit via block 180 from branch 178. If in decision region $D_1$, $Q_k$ is less than 0, $Z_k$ lags $\hat{Z}_{k-1}$ and a minus one is automatically inserted by the phase lock loop circuit to advance the carrier tracking signal. Thus, the carrier tracking signal when determined to be in decision region $D_1$ is automatically properly corrected for phase during each baud interval. The same correction is afforded for determination of $Z_k$ in regions $D_2$, $D_3$, and $D_4$ by virtue of branches 182–186 and blocks 188–192, respectively.

Figure 8:
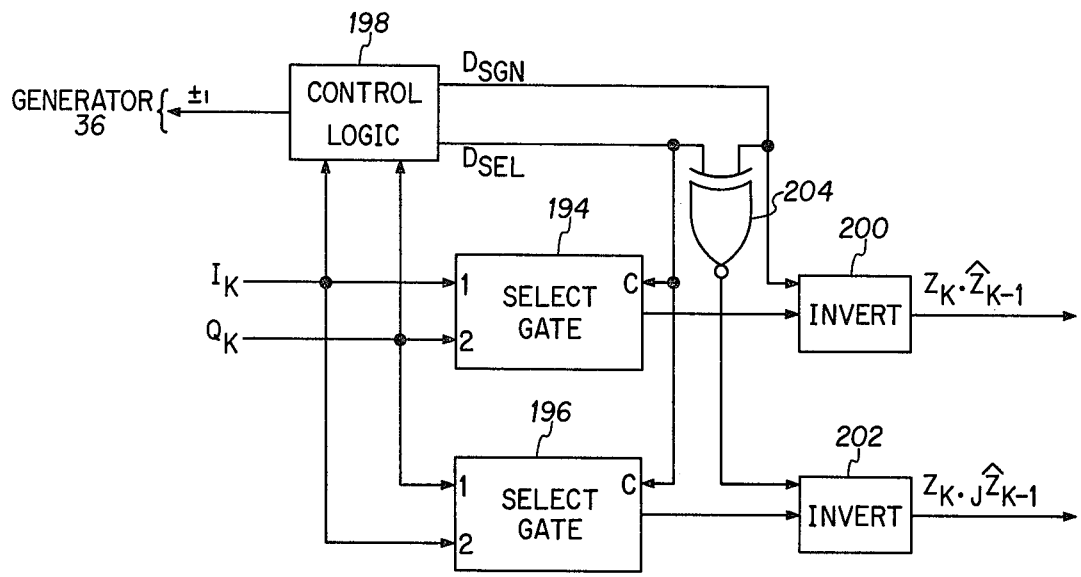
FIG. 8 depicts the simplified dot product circuitry used in the second implementation of FIG. 6.

A simple logic circuit responsive to the control signals $D_{SEL}$ and $D_{SGN}$ for performing the foregoing dot product computations is shown in FIG. 8 wherein $I_k$ is applied to the first input and second input of select gates 194 and 196, respectively. $Q_k$ is applied to the second input and first input of select gates 194 and 196, respectively. Each select gate has a control input C, connected to receive the control signal $D_{SEL}$ generated in the control logic block 198 representing the algorithm flow chart of FIG. 7. As shown by the accompanying left table of FIG. 1, a "1" for $D_{SEL}$ passes to the output of select gates 194 and 196 the signals appearing at their 1 inputs, whereas a "0" passes the signals appearing on their 2 inputs. The output of select gate 194 is connected to an inverter 200 while the output of select gate 196 is connected to an inverter 202. The inverter 200 is controlled directly by the control signal $D_{SGN}$ generated in control logic block 198 in accordance with the right table of FIG. 8. Accordingly, whenever $D_{SGN}$ assumes a "1" inverter 200 inverts the signal appearing at its input whereas when $D_{SGN}$ assumes a "0", inverter 200 does not so invert. Referring to table of FIG. 6, it will be readily seen that the output of inverter 200 is in fact the dot product $Z_k \cdot \hat{Z}_{k-1}$. Inverter 202 is controlled from the output of an exclusive NOR gate 204 whose inputs are $D_{SEL}$ and $D_{SGN}$. When these signals are the same, the output of exclusive NOR gate 204 is high to cause an inversion by inverter 202 and when they are not, the low level output of NOR gate 204 inhibits inversion by inverter 202. It will be readily seen that the output of inverter 202 is the dot product of $Z_k$ and $j\hat{Z}_{k-1}$.

The plus or minus one signal produced by control logic block 198 for correcting the phase of the injection signal is applied to the injection signal generator 36 preferably through a digital accumulator (not shown). the PLL circuit path follows the $I_k$ and $Q_k$ outputs of the demodulator 34 through the control logic 198 and back to the generator 36 which could be merely a VCO.

A third method for obtaining the dot product to perform the transition metric is based on using an absolute reference signal generated from a phase lock loop circuit like the foregoing wherein the injection signal at the output of generator 36 once again tracks the baseband signal. As shown by the tree diagram in FIG. 9, this reference signal can assume any one of four absolute states 0°, 90°, 180°, or 270° at the end of each baud interval. Because of the encoding employed, given a particular state at $t_{k-1}$, the carrier signal can move into only one of three of the four states at $t_k$ engendering a phase shift of 0° or ±90°. If the reference signal is in state $S_0$, then the transition metric T(0°) will be maximum when the baseband signal $Z_k$ is equal to $I_k$ for all paths thereinto. Likewise, if the reference signal is at 90° the transition metric T(90°) will be maximum when $Z_k$ is equal to $Q_k$ for all paths thereinto. Extending this to the transition metrics T(180°) and T(270°), these will be maximum when $Z_k$ is equal to $-I_k$ and $-Q_k$, respectively. These values are inserted in the path metrics for the various paths into the four possible states of the absolute reference signal to determine the state metrics and survivor decision metrics as delineated in FIG. 9. The associated values for the data bit $a_k$ which were obtained from FIG. 3 are shown in the table below the tree diagram wherein the middle column corresponds to the prior state designated by the survivor decision metric $\delta_{k-1}$.

Figure 9:
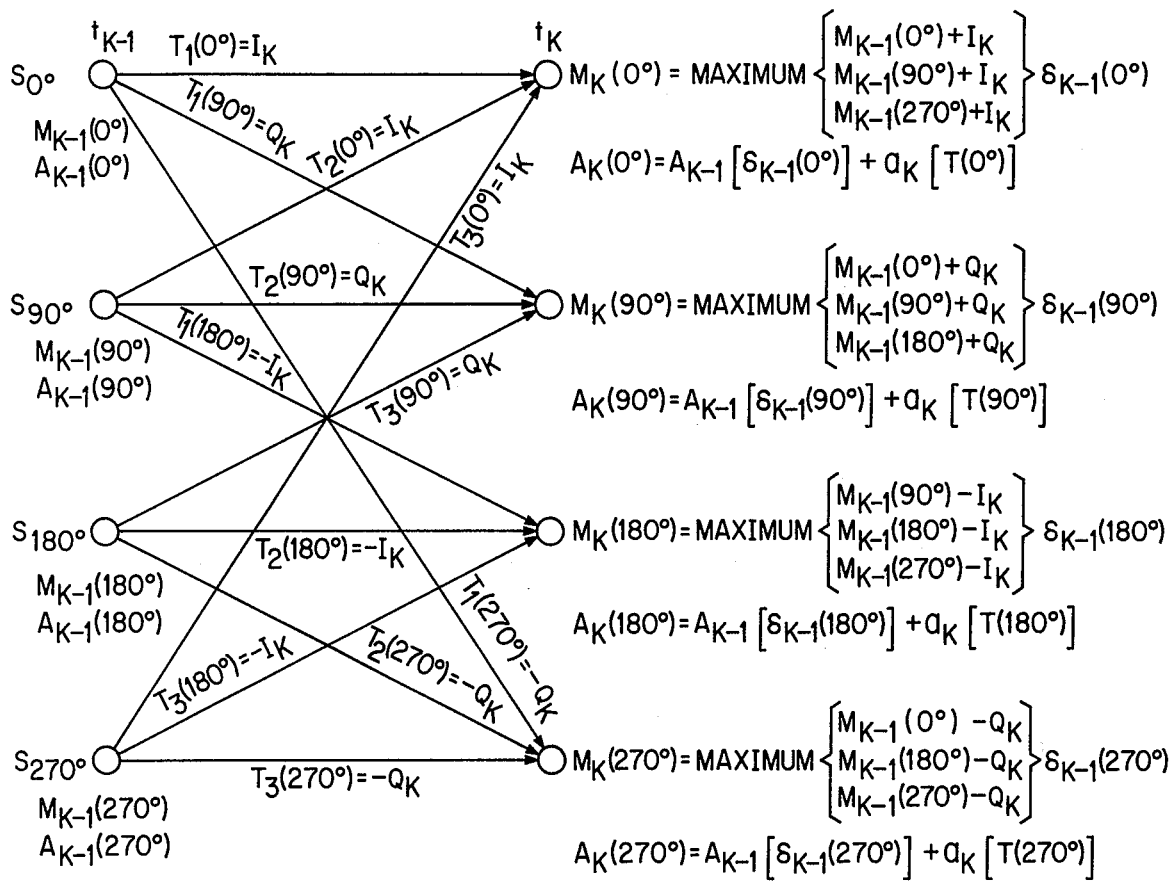
FIG. 9 is a four-state tree diagram which is applicable to a third dot product implementation employing an absolute reference to also simplify the dot product circuitry.
Figure 10:
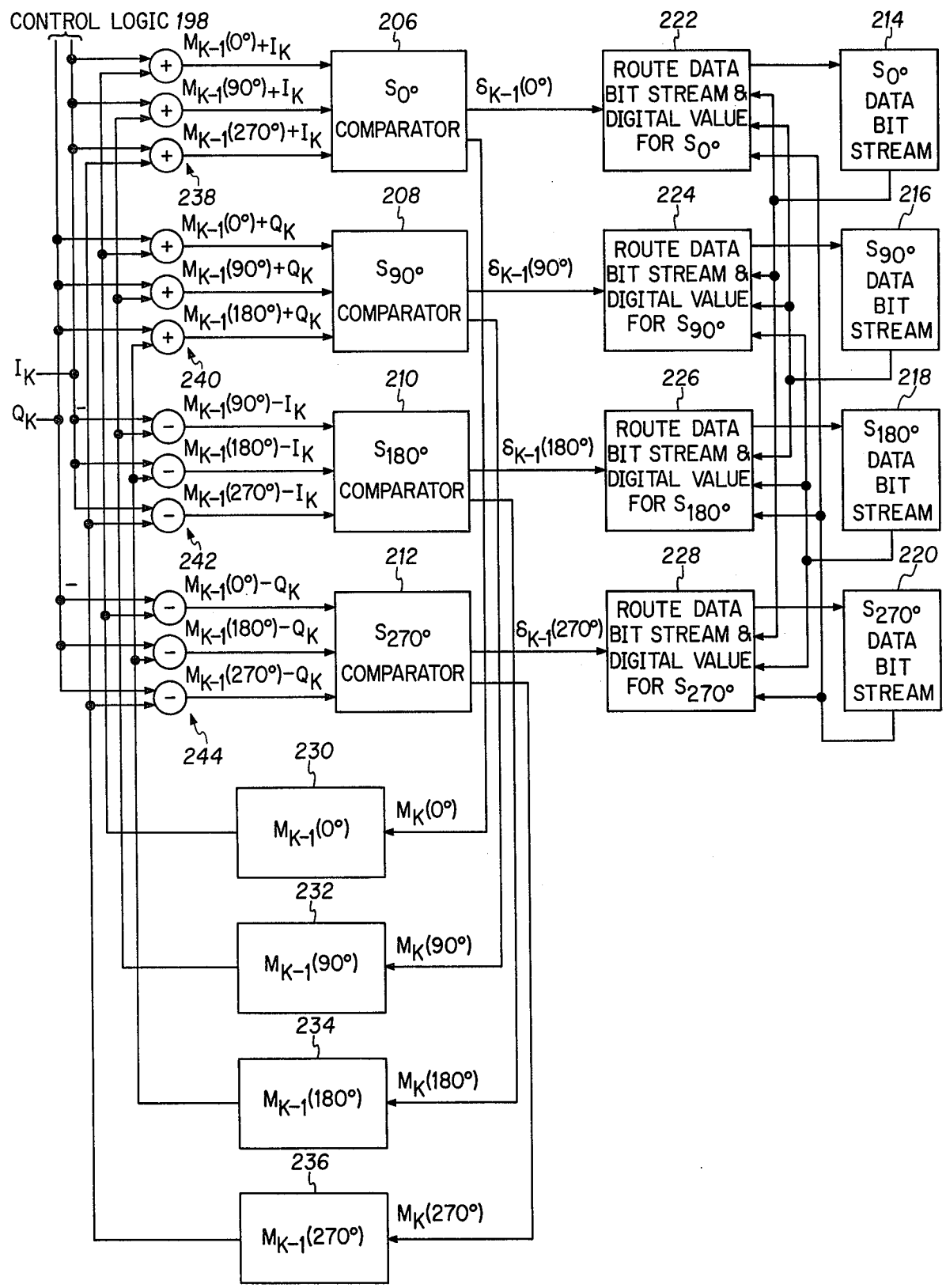
FIG. 10 is a block diagram for the tree searching detection applicable to the absolute reference implementation of FIG. 9.

FIG. 10, like that of FIG. 1, is a block diagram for implementing the tree searching detection by effecting the computations of the various metrics used for generating the various data bits streams for the four states associated with the absolute reference signal approach of FIG. 9. Thus, four comparators, 206-212, are required for the four respective states $S_{0°}$-$S_{270°}$ along with four data registers, 214-220 and their respective routing blocks 222-228. Four registers, 230-236, are likewise provided for each of the four states $S_{0°}$ - $S_{270°}$ for storing the individual prior state metrics $M_{k-1}$. The path metrics for state $S_o$ are computed by adding $I_k$ to the appropriate outputs of registers 230-236 in adders 238 as shown in FIG. 10 in accordance with the equations delineated in FIG. 9. Similarly, adders 240 combine $Q_k$ with the appropriate register 230-236 outputs to provide the path metrics for comparison in comparator 208 for state $S_{90°}$. The path metrics for states $S_{180°}$ and $S_{270°}$ are computed through subtractors 242 and 244, respectively. The outputs of the data bit stream registers 214-220 are appropriately routed to their possible destinations (there being three for each register) as is evident from FIG. 9.

Numerous modifications to the foregoing disclosure are possible without departing from the scope and spirit of the invention engendered thereby. For example, although a digital implementation has been described, it is quite conceivable, although perhaps not practical to employ an analog implementation. Also, although a correlatively encoded digital signal was converted to a three-level frequency signal for transmission purposes to conserve bandwidth, other encoding and modulation schemes are unquestionably feasible as well as other numerical level frequencies. Thus, the invention is not to be limited to the scope of the foregoing disclosure, but rather by the claims which will now be set forth.

What is claimed is:

1. A method of detecting digital data correlatively encoded into discrete plural states and transmitted by modulating a carrier signal whose phase in each baud interval is a function of the data, comprising:

demodulating the transmitted signal to provide a baseband signal which retains the phase information;

generating a reference signal from the baseband signal;

comparing the baseband signal during each baud interval with the reference signal to determine the probability, designated transition metric, of traversing each possible path into each state from the respective possible prior states in the previous baud interval;

adding the transition metric for each path to the state metric for the prior state from which the path originated to arrive at a path metric, said state metric representing the highest probability of being in the associated prior state;

comparing during each baud interval all of the path metrics for each state to determine the maximum one thereof, designated the survivor metric;

storing the survivor metric for each state in each baud interval for use as the prior state metric in the next succeeding baud interval, and generating for each state a fixed length data bit stream which is the same as the data bit stream generated during the previous baud interval for the prior state corresponding to its survivor metric with the oldest bit thereof being omitted and the data bit associated with the survivor metric path being inserted as the newest bit.

2. The method of claim 1 wherein the transition metric is obtained by performing a dot product analysis of the baseband and reference signals.

3. The method of claim 2 wherein the reference signal in each baud interval is the same as the baseband signal in the immediately preceding baud interval.

4. The method of claim 3 wherein the baseband signal is represented by its complex in-phase and quadrature components, and the dot products are obtained therefrom through scalar operations.

5. The method of claim 2 wherein the reference signal in each baud interval is an estimate of the baseband signal for the immediately preceding baud interval which is generated through a phase lock loop circuit wherein the injection signal for demodulating the transmitted signal is made to track the baseband signal.

6. The method of claim 5 wherein the baseband signal can shift 0°, +90°, or −90° during each baud interval and is represented by its complex in-phase and quadrature components, the reference signal is assumed to be coincident with one of the orthogonal axes in the complex plane and the phase of the injection signal is controlled by the deviation therebetween.

7. The method of claim 6 wherein the 90° phase shift is effectuated continuously and uniformly over the entire baud interval.

8. The method of claim 2 wherein the reference signal is made equal to the baseband signal through a phase lock loop circuit wherein the injection signal for demodulating the transmitted signal is made to track the baseband signal.

9. The method of claim 8 wherein the baseband signal can shift 0°, +90°, or −90° during each baud interval and is represented by its complex in-phase and quadrature components and the dot products are obtained by simple addition or subtraction.

10. The method of claim 9 wherein the 90° phase shift is effectuated continuously and uniformly over the entire baud interval.

11. A method of detecting digital data correlatively encoded into discrete plural digital states from the complex in-phase and quadrature components of the baseband signal representing the data, comprising:

generating a reference signal from the complex components;

comparing the complex components of the baseband signal with those of the reference signal through a dot product analysis during each baud interval to determine the probability, designated transition metric, of traversing each possible path into each state from the respective possible prior states in the previous baud interval;

adding the transition metric for each path to the state metric for the prior state from which the paths originated, to arrive at a path metric, said state metric representing the highest probability of being in the associated prior state;

comparing during each baud interval all of the path metrics for each state to determine the maximum one thereof, designated the survivor metric;

storing the survivor metric for each state in each baud interval for use as the prior state metric in the next succeeding baud interval, and generating for each state a fixed length data bit stream which is the same as the data bit stream generated during the previous baud interval for the prior state corresponding to its survivor metric with the oldest bit thereof being omitted and the digital value associated with the survivor metric path being inserted as the newest bit.

12. The method of claim 11 wherein the reference signal in each baud interval is the same as the baseband signal in the immediately preceding baud interval.

13. The method of claim 12 wherein the baseband signal can shift 0° or plus or minus 90° continuously and uniformly over the baud interval.

14. The method of claim 11 wherein the reference signal in each baud interval is an estimate of the baseband signal for the immediately preceding baud interval which is generated through a phase lock loop circuit wherein the injection signal for demodulating the transmitted signal is made to track the baseband signal.

15. The method of claim 14 wherein the baseband signal can shift 0°, +90°, or −90° during each baud interval, the reference signal is assumed to be coincident with one of the orthogonal axes in the complex phase and the phase of the injection signal is controlled by the deviation therebetween.

16. The method of claim 15 wherein the 90° phase shift is effectuated continuously and uniformly over the entire baud interval.

17. The method of claim 11 wherein the reference signal is made equal to the baseband signal through phase lock loop circuit wherein the injection signal for demodulating the transmitted signal is made to track the baseband signal.

18. The method of claim 17 wherein the baseband signal can shift 0° or plus or minus 90° continuously and uniformly over the entire baud interval.

19. A detector for detecting digital data correlatively encoded into discrete plural states from the complex in-phase and quadrature components of the baseband signal representing the data, comprising:

means for generating a reference signal from the complex components;

means for comparing the complex components of the baseband signal with those of the reference signal through a dot product analysis during each baud interval to determine the probability, designated transition metric, of traversing each possible path into each state from the respective possible prior states in the previous baud interval;

means for adding the transition metric for each path to the state metric for the prior state from which the paths originated, to arrive at a path metric, said state metric representing the highest probability of being in the associated prior state;

means for comparing during each baud interval all of the path metrics for each state to determine the maximum one thereof, designated the survivor metric;

means for storing the survivor metric for each state in each baud interval for use as the prior state metric in the next succeeding baud interval, and means for generating for each state a fixed length data bit stream which is the same as the data bit stream generated during the previous baud interval for the prior state corresponding to its survivor metric with the oldest bit thereof being omitted and the digital value associated with the survivor metric path being inserted as the newest bit.

20. The detector of claim 19 wherein the baseband signal can shift 0°, or plus or minus 90°, uniformly over the baud interval.

21. A receiver for detecting digital data correlatively encoded into discrete plural states and transmitted by modulating a carrier signal whose phase in each baud interval is a function of the data, comprising:

means for demodulating the transmitted signal to provide a baseband signal which retains the information;

means for generating a reference signal from the baseband signal;

means for comparing the baseband signal during each baud interval with the reference signal through a dot product analysis to determine the probability, designated transmission metric of traversing each possible path into each state from the respective possible prior states in the previous baud interval;

means for adding the transition metric for each path to the state metric for the prior art state from which the path originated to arrive at a path metric, said state metric representing the highest probability of being in the associated prior state;

means for comparing during each baud interval all of the path metrics for each state to determine the maximum one thereof, designated the survivor metric;

means for storing the survivor metric for each state in each baud interval for use as the prior state metric in the next succeeding baud interval, and means for generating for each state a fixed length data bit stream which is the same as the data bit stream generated during the previous baud interval for the prior state corresponding to its survivor metric with the oldest bit thereof being omitted and the data bit associated with the survivor metric path being inserted as the newest bit.

22. The receiver of claim 21 wherein the baseband and reference signals are represented by their complex in-phase and quadrature components and the baseband signal can shift 0° or plus or minus 90° during each baud interval.

23. The receiver of claim 22 wherein the 90° phase shift is effectuated continuously and uniformly over the entire baud interval.

24. A communications system for transmitting digital data between distant points, comprising:

a transmitter having an encoder for correlatively encoding the data into discrete plural states and a modulator responsive thereto for providing a signal to be transmitted whose phase in each baud interval is a function of the data;

a demodulator for demodulating the transmitted signal to provide a baseband signal which retains the phase information;

means for generating a reference signal from the baseband signal;

means for comparing the baseband signal during each baud interval with the reference signal through a dot product analysis to determine the probability, designated transition metric, of traversing each possible path into each state from the respective possible prior states in the previous baud interval;

means for adding the transition metric for each pair to the state metric for the prior state from which the path originated to arrive at a path metric, said state metric representing the highest probability of being in the associated prior state;

means for comparing during each baud interval all of the path metrics for each state to determine the maximum one thereof, designated the survivor metric;

means for storing the survivor metric for each state in each baud interval for use as the prior state metric in the next succeeding baud interval, and means for generating for each state a fixed length data bit stream which is the same as the data bit stream generated during the previous baud interval for the prior state corresponding to its survivor metric with the oldest bit thereof being omitted and the data bit associated with the survivor metric path being inserted as the newest bit.

25. The system of claim 24 wherein the baseband and reference signals are represented by their complex in-phase and quadrature components and the baseband signal can shift 0° or plus or minus 90° in each baud interval.

26. The system of claim 25 wherein the 90° phase shift is effectuated continuously and uniformly over the entire baud interval.

* * * * *

UNITED STATES PATENT AND TRADEMARK OFFICE
CERTIFICATE OF CORRECTION

PATENT NO. : 4,087,752
DATED : May 2, 1978
INVENTOR(S) : William J. Melvin

It is certified that error appears in the above-identified patent and that said Letters Patent are hereby corrected as shown below:

IN THE SPECIFICATION

Column 6, line 48, after "presented" delete "by" and substitute therefor -- for --.

Column 7, line 52, after "metric" delete "$m_{k-1}$" and substitute therefor -- $M_{k-1}$.

Column 9, line 55, after "moves" delete "the" and substitute therefor -- to --.

Column 11, line 25, delete "the individual" and substitute therefor --their individual --.

IN THE CLAIMS

Column 14, line 35, after "prior" delete "art".

Signed and Sealed this

*Fourteenth* Day of *November 1978*

[SEAL]

*Attest:*

RUTH C. MASON
*Attesting Officer*

DONALD W. BANNER
*Commissioner of Patents and Trademarks*